United States Patent
Simkovics

(10) Patent No.: US 7,841,602 B2
(45) Date of Patent: Nov. 30, 2010

(54) ACTIVE, DIVIDED MOTOR VEHICLE STABILIZER HAVING INSTALLED ELECTRIC PIVOT MOTOR

(75) Inventor: Reinhard Simkovics, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/967,527

(22) Filed: Dec. 31, 2007

(65) Prior Publication Data

US 2008/0100019 A1   May 1, 2008

Related U.S. Application Data

(63) Continuation of application No. PCT/EP2006/006035, filed on Jun. 23, 2006.

(30) Foreign Application Priority Data

Jul. 2, 2005   (DE) ................ 10 2005 031 037

(51) Int. Cl.
*B60G 17/015* (2006.01)
*B60G 21/055* (2006.01)

(52) U.S. Cl. ................. 280/5.511; 280/124.107

(58) Field of Classification Search ............... 267/277; 280/5.511, 124.106, 124.107
See application file for complete search history.

(56) References Cited

U.S. PATENT DOCUMENTS

| | | | |
|---|---|---|---|
| 4,919,444 A | | 4/1990 | Leiber et al. |
| 5,700,027 A | * | 12/1997 | Schiffler ............ 280/124.162 |
| 6,022,030 A | * | 2/2000 | Fehring ............... 280/5.511 |
| 6,149,166 A | * | 11/2000 | Struss et al. ........... 280/5.511 |
| 6,318,737 B1 | * | 11/2001 | Marechal et al. ....... 280/5.511 |
| 6,328,323 B1 | * | 12/2001 | Elser ................ 280/124.152 |
| 6,361,033 B1 | * | 3/2002 | Jones et al. ............. 267/187 |
| 6,425,585 B1 | * | 7/2002 | Schuelke et al. ........ 280/5.511 |
| 6,435,531 B1 | * | 8/2002 | Acker et al. .......... 280/124.107 |
| 6,550,788 B2 | * | 4/2003 | Schmidt et al. ......... 280/5.511 |
| 6,698,767 B2 | * | 3/2004 | Hagan ................. 280/5.511 |
| 7,100,926 B2 | * | 9/2006 | Osterlanger et al. ..... 280/5.502 |

(Continued)

FOREIGN PATENT DOCUMENTS

DE     37 40 244 A1    6/1989

(Continued)

OTHER PUBLICATIONS

German Search Report dated May 15, 2006 with an English translation of the pertinent portions (Nine (9) pages).

(Continued)

*Primary Examiner*—Faye M. Fleming
*Assistant Examiner*—Laura Freedman
(74) *Attorney, Agent, or Firm*—Crowell & Moring LLP

(57) ABSTRACT

The present invention relates to an active, divided stabilizer for of motor vehicle having an installed electric pivot motor for roll regulation, which comprises at least one actuating drive made of electric motor and pivot motor transmission and a housing, at least one housing part being connected to an associated stabilizer part for torque transmission. The present invention is distinguished in that the housing part has an axially oriented, central recess, into which the stabilizer part extends essentially up to its end, and the connection for torque transmission between the housing part and the associated stabilizer part is located there.

6 Claims, 1 Drawing Sheet

U.S. PATENT DOCUMENTS

| | | |
|---|---|---|
| 7,150,458 B2 | 12/2006 | Reichel et al. |
| 7,500,686 B2 * | 3/2009 | Munster .............. 280/124.107 |
| 2003/0015048 A1 * | 1/2003 | Schmidt et al. ............. 74/99 R |
| 2003/0137090 A1 | 7/2003 | Reichel et al. |
| 2005/0236793 A1 * | 10/2005 | Taneda et al. ......... 280/124.107 |
| 2009/0152824 A1 * | 6/2009 | Grieshaber et al. ....... 280/5.509 |

FOREIGN PATENT DOCUMENTS

| | | |
|---|---|---|
| DE | 44 01 397 A1 | 7/1996 |
| DE | 198 46 275 A1 | 12/1999 |
| DE | 10016639 C1 * | 5/2001 |
| DE | 100 12 915 A1 | 10/2001 |
| DE | 10225294 A1 * | 12/2003 |
| DE | 102 39 657 B3 | 4/2004 |
| DE | 600 08 166 T2 | 7/2004 |
| FR | 1.278.714 | 11/1960 |
| WO | WO 2004/085179 A1 | 10/2004 |

OTHER PUBLICATIONS

International Search Report dated Sep. 18, 2006 with an English translation of the pertinent portions (Four (4) pages).

* cited by examiner

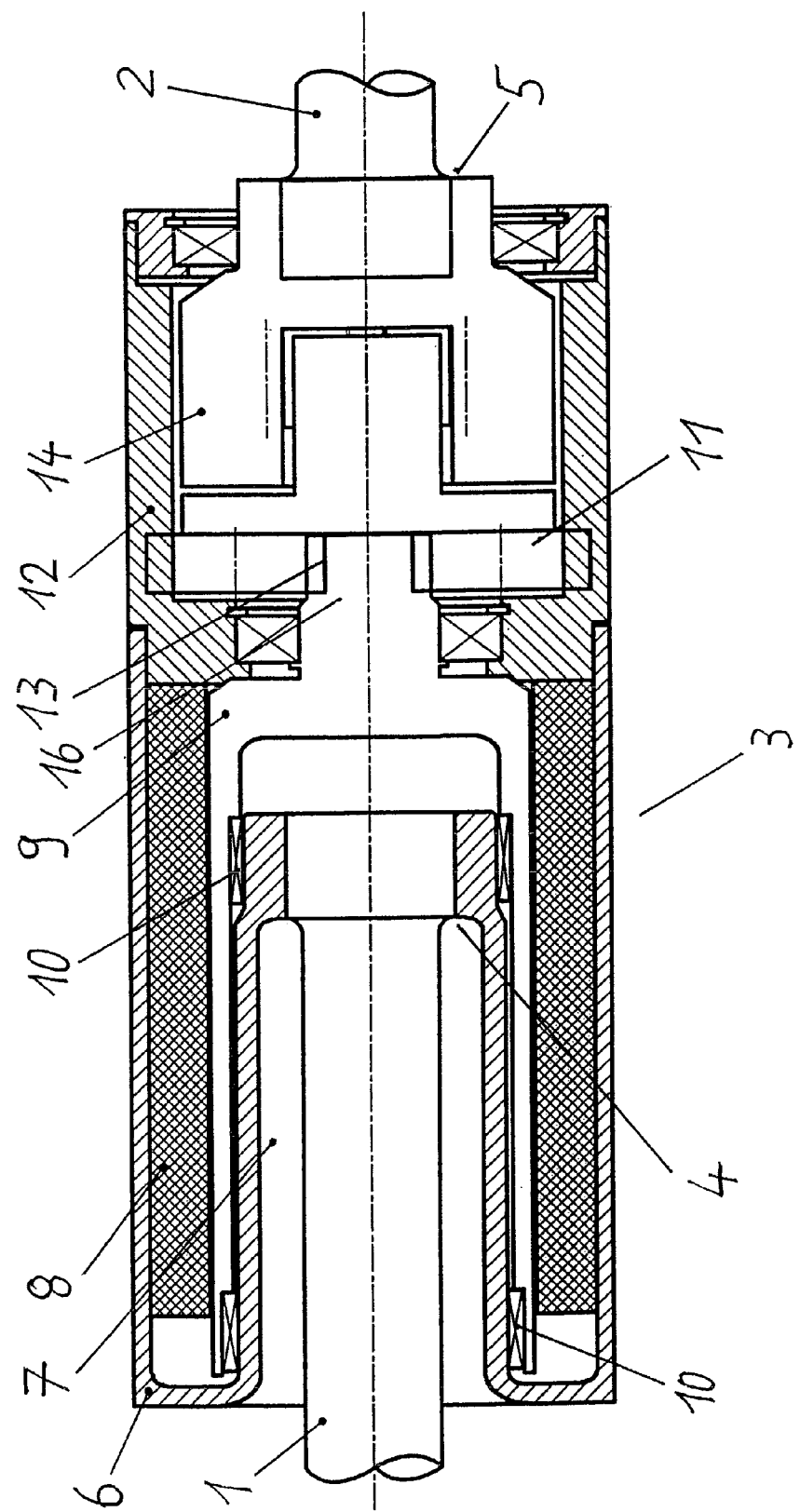

ACTIVE, DIVIDED MOTOR VEHICLE STABILIZER HAVING INSTALLED ELECTRIC PIVOT MOTOR

CROSS REFERENCE TO RELATED APPLICATIONS

This application is a continuation of PCT International Application No. PCT/EP2006/006035, filed Jun. 23, 2006, which claims priority under 35 U.S.C. §119 to German Patent Application No. 10 2005 031 037.3, filed Jul. 2, 2005, the entire disclosures of which are herein expressly incorporated by reference.

BACKGROUND AND SUMMARY OF THE INVENTION

The present invention relates to an active, divided stabilizer for a motor vehicle having an installed electric pivot motor for roll regulation.

Dividing a motor vehicle stabilizer into a first stabilizer part assigned to the suspension of the left wheel of a vehicle axle and a second stabilizer part assigned to the suspension of the right wheel of the vehicle axle is already known. If these stabilizer parts are pivotable in relation to one another around their shared longitudinal axis, significantly improved roll stability may be achieved in relation to suspensions having one-piece stabilizers, if a suitable pivot motor is provided between the two stabilizer parts, which pivots these stabilizer parts as needed in relation to one another on the basis of a suitable activation.

An electromechanical pivot motor has at least one electric motor and a mechanical transmission. A stabilizer is thus obtained whose two stabilizer parts, which are connected to one another by the electromechanical pivot motor, may be pivoted in a targeted way in relation to one another thereby, so that a desired stabilizer torque is generated, which prevents the rolling of the vehicle structure. Such a stabilizer is described in German Patent Document DE 198 46 275 A1.

In stabilizers having an installed pivot motor, the effective length which may be torqued is restricted in relation to typical stabilizers without a pivot motor. The active torsion length is composed of the length of the two stabilizer parts in the vehicle transverse direction. Due to this shortening of the active torsion length, because of the installed pivot motor, the fatigue strength values of the stabilizer may worsen. In addition, the characteristic of the motor vehicle upon suppression of roll movements is thus changed, because the overall spring rigidity increases.

The object of the present invention is to avoid these disadvantages as much as possible.

According to the present invention, a divided vehicle stabilizer having an installed pivot motor for roll regulation, which has at least one actuating drive made of electric motor and pivot motor transmission and a housing, at least one housing part being connected to an associated stabilizer part for torque transmission, is characterized in that the housing part has an axially oriented, central recess, into which the stabilizer part extends essentially up to its end and the connection for torque transmission between the housing part and the stabilizer part belonging thereto is located there.

This has the advantage that the stabilizer part is deflected by a larger distance at equal load and the suppression of the roll movement may thus be made softer and may be tuned more finely. The service life of the stabilizer may be increased. Due to the possibility of being able to use stabilizers having a smaller diameter, the vehicle weight is reduced and the production costs for the stabilizer are lower. The reduction of the passive stabilizer length due to the installation of the pivot motor is thus minimized, because of which lower spring rates may be achieved. This results in better comfort properties of a motor vehicle having an active stabilizer. The system behavior of the active roll stabilization system thus approaches that of a passive stabilizer. The basic design of suspensions for vehicles with and without active roll stabilization may thus be executed identically, which results in a significant cost reduction by using identical parts.

In an advantageous embodiment of the present invention, the electric motor is designed in such a way that its stator and rotor extend at least partially around the central recess of the housing part. The rotor of the electric motor may advantageously be mounted on the central recess of the housing part and may preferably be implemented as pot-shaped.

In a further advantageous embodiment of the present invention, the pivot motor transmission is a single-stage or dual-stage planetary gear or a harmonic drive transmission. The drive of the planetary gear advantageously occurs via a sun wheel and its output occurs via a planet carrier.

Other objects, advantages and novel features of the present invention will become apparent from the following detailed description of the invention when considered in conjunction with the accompanying drawings.

BRIEF DESCRIPTION OF THE DRAWINGS

A preferred exemplary embodiment of the present invention is described in greater detail in the following description and the associated drawing. For this purpose, the single FIGURE shows, in a sectional illustration, an electric pivot motor according to the present invention for a motor vehicle stabilizer for pivoting two stabilizer parts in relation to one another.

DETAILED DESCRIPTION OF THE DRAWINGS

The FIGURE shows an exemplary pivot motor 3 for an active stabilizer for a motor vehicle, for coupling two wheels (not shown) of a vehicle axial line. In this embodiment, a first stabilizer part 1 is assigned to one wheel and a second stabilizer part 2 is assigned to the other wheel. The two stabilizer parts 1, 2 are coupled by an actuator, implemented as an electric pivot motor 3, for controlling the lateral inclination of the motor vehicle by tensioning the stabilizer parts 1, 2 in relation to one another. Each stabilizer part 1, 2 extends from a connector 4, 5 assigned to the pivot motor 3 to a connector (not shown) assigned to the wheel. The first stabilizer part 1 is fastened to one housing part 6 and a second stabilizer part 2 is fastened to a transmission output element. Fractions of the stabilizer parts 1, 2 are shown in the FIGURE, from which it may be seen that the stabilizer parts 1, 2 are situated coaxially to the pivot motor 3 in the area of the fastening. The torque transmission to the stabilizer parts 1, 2 occurs via a suitable shaft-hub connection, such as teeth between the housing part 6 and the first stabilizer part 1, and/or between the transmission output element and the second stabilizer part 2.

The exemplary pivot motor 3 is designed in such a way that a housing part 6 has an axially oriented, central recess 7, into which the associated stabilizer part 1 extends essentially up to its end. The connection for torque transmission is located therein, i.e., the connector 4 between the housing part 6 and the associated stabilizer part 1. The active torsion length of the stabilizer part 1 is lengthened in that it is guided into the pivot motor 3 and is first connected thereto at the connector 4. The spring rate of the stabilizer part 1 is thus less at identical cross-section and otherwise similar construction in comparison to the stabilizer part according to the prior art, which extends from the connector assigned to the wheel to a connector assigned to a pivot motor outside a housing part.

The electric motor installed as the pivot motor drive in the housing part 6 is designed in such a way that its stator 8 and rotor 9 extend at least partially around the central recess 7 of the housing part 6, the rotor 9, which is implemented as pot-shaped, being mounted on the central recess 7 of the housing part 6 via suitable bearings 10, such as friction bearings. The rotor 9 of the electric motor is installed inside the stator 8, which is implemented as a hollow cylinder connected on its external circumference to the housing part 6, in the housing part 6. The electric motor may advantageously be an internal-rotor motor in the form of a transversal-flux motor. Notwithstanding this, external-rotor motors or radial-flux motors are also envisioned. The exemplary electric motor is powered for the roll regulation, and then outputs its torque to a pivot motor drive.

The pivot motor transmission is a dual-stage planetary gear 11, whose drive occurs via a sun wheel 13 and whose output occurs via a planet carrier 14, which is connected to the stabilizer part 2 via the connector 5 assigned to the pivot motor 3. Teeth of the sun wheel 13 driven by the electric motor are, viewed in the longitudinal direction, attached to one end of the rotor 9, which is mounted floating as a rotor bearing pin 16 in a further housing part 12. Rotor bearing pin 16, rotor 9, and sun wheel 13 may be implemented in one piece or multiple parts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A divided motor vehicle stabilizer for roll regulation; comprising:
    an actuating drive having an installed electric pivot motor including a rotor and a stator, a pivot motor transmission and two housing parts, one of the two housing parts being fixed to and integral with a connector portion which is directly and fixedly connected to an associated stabilizer part for torque transmission, with the stator and rotor of the electric pivot motor being arranged substantially in the one housing part; and
    an axially oriented central recess defined by the connector portion of the one housing part, the associated stabilizer part extending substantially up to its end into the central recess.

2. The divided motor vehicle stabilizer according to claim 1, wherein the stator and the rotor of the electric pivot motor extend at least partially around the central recess of the one housing part.

3. The divided motor vehicle stabilizer according to claim 1, wherein the rotor of the electric motor is mounted on the central recess of the one housing part.

4. The divided motor vehicle stabilizer according to claim 3, wherein the rotor is pot-shaped.

5. The divided motor vehicle stabilizer according to claim 1, wherein the pivot motor transmission comprises one of a single-stage planetary gear, a dual-stage planetary gear and a harmonic drive transmission.

6. The divided motor vehicle stabilizer according to claim 5, wherein a drive of the planetary gear comprises a sun wheel, and an output comprises a planet carrier.

\* \* \* \* \*